M. HEBTING.
POTATO DIGGER AND SHAKER.
APPLICATION FILED FEB. 18, 1908.

902,400.

Patented Oct. 27, 1908.

2 SHEETS—SHEET 1.

WITNESSES:

INVENTOR
Martin Hebting
BY
W.J.FitzGerald & Co
Attorneys

M. HEBTING.
POTATO DIGGER AND SHAKER.
APPLICATION FILED FEB. 18, 1908.
902,400.
Patented Oct. 27, 1908.
2 SHEETS—SHEET 2.
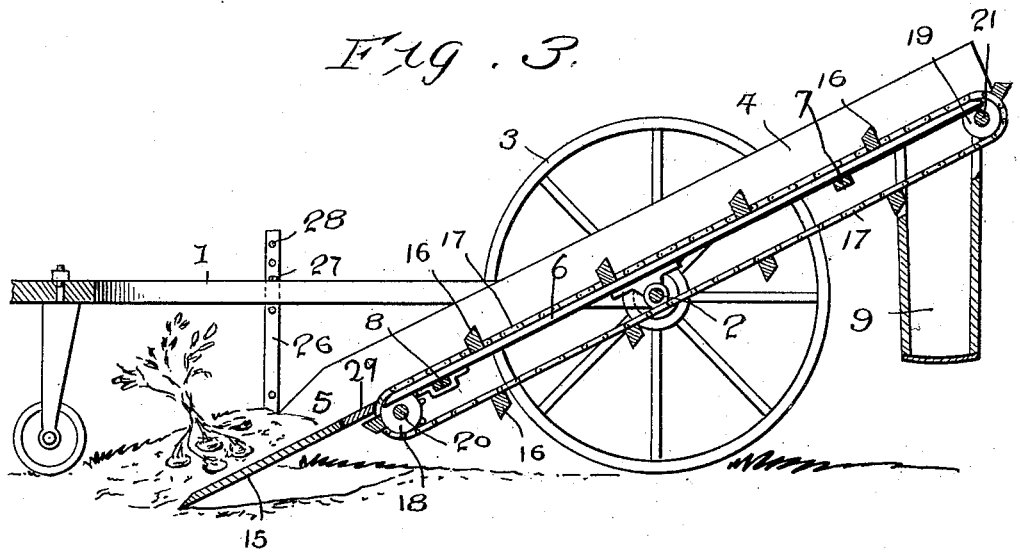
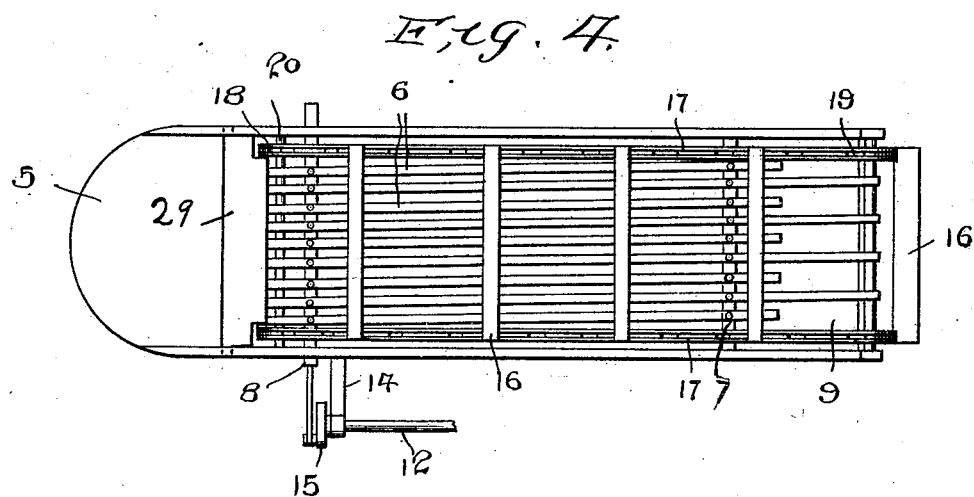

UNITED STATES PATENT OFFICE.

MARTIN HEBTING, OF KAW, OKLAHOMA.

POTATO DIGGER AND SHAKER.

No. 902,400.   Specification of Letters Patent.   Patented Oct. 27, 1908.

Application filed February 18, 1908. Serial No. 416,504.

*To all whom it may concern:*

Be it known that I, MARTIN HEBTING, a citizen of the United States, residing at Kaw, in the county of Kay and State of Oklahoma, have invented certain new and useful Improvements in Potato Diggers and Shakers; and I do hereby declare the following to be a full, clear, and exact description of the invention, such as will enable others skilled in the art to which it appertains to make and use the same.

My invention relates to new and useful improvements in potato diggers and shakers and is more particularly an improvement over Patent #870677, granted to me under date of November 12, 1907.

My prime object is to provide means for agitating the soil containing the potatoes as it passes lengthwise of the digger.

A further object is to provide means for conveying the potatoes and vines to the rear end of the digger and a still further object is to provide suitable driving mechanism for the several parts of the device.

Other objects and advantages will be hereinafter referred to and more particularly pointed out in the claims.

Figure 1:
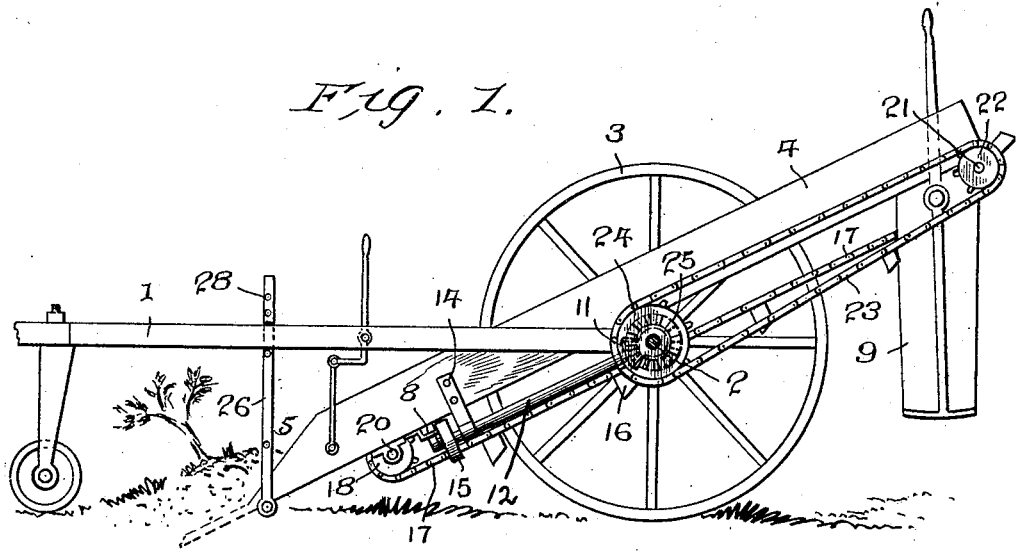
Figure 2:
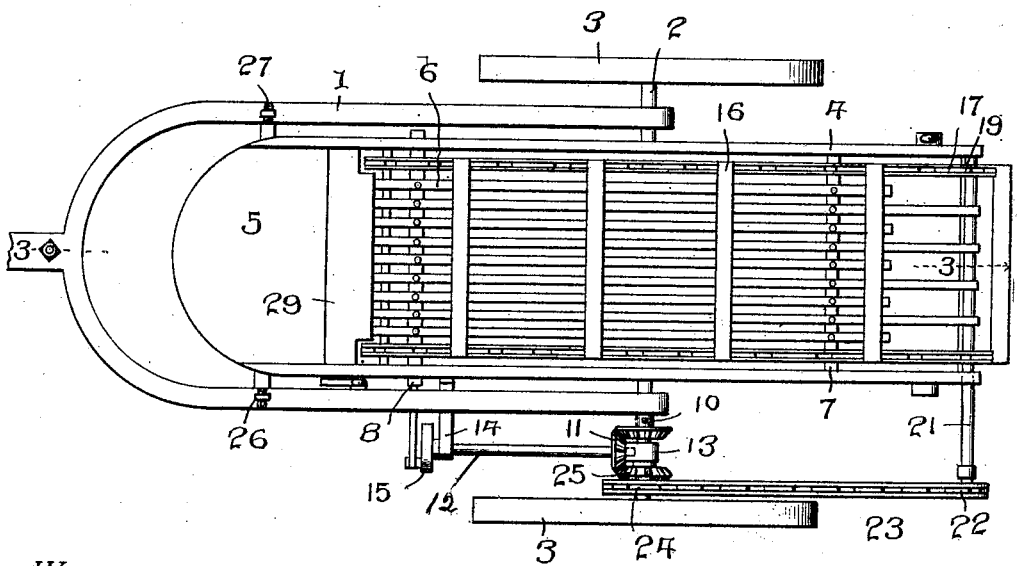

In the accompanying drawings which are made a part of this application, Figure 1 is an elevation of my improved digger, showing one of the supporting wheels removed. Fig. 2 is a top plan view thereof. Fig. 3 is a sectional view as seen on line 3—3, Fig. 2, and, Fig. 4 is a top plan view of the agitator and conveying mechanism.

Referring to the drawings in which similar reference numerals designate corresponding parts throughout the several views, 1 indicates a frame, which may be constructed in the usual or any preferred manner at the rear end of which is mounted an axle 2, to the outer ends of which are secured driving wheels 3.

Pivotally mounted upon the axle 2 between the arms of the frame 1, is a chute 4 having at its lower end a plow 5, which is adapted to enter and loosen the soil and convey the same into said chute, the bottom of said chute being formed of parallel agitating bars 6, said bars being spaced apart whereby the pulverized soil will pass between the bars and the potatoes will be retained in position thereon, said bars being pivoted adjacent their rear ends to a cross bar 7, while the forward ends of the bars are pivotally secured to a pitman 8, whereby when the pitman is moved longitudinally, the agitating bars 6 will be swung on their pivot points and the soil passing over the bars agitated, thereby separating the soil from the potatoes.

Each alternate bar 6 is extended beyond the end of the next succeeding bar at the rear end of the chute 4, so that the potatoes may readily descend when they have reached the ends of the shorter bars, a receptacle 9 being located at the rear end of the chute 4 to receive the potatoes while the longer bars 6 carry the vines over the receptacle and deposit the same on the ground.

Fixed to the axle 2 and at one side of the frame 1, is a bevel gear 10, with which meshes a bevel pinion 11 secured adjacent one end of a shaft 12, that portion of the shaft extending beyond the pinion 11, entering a seat in a collar 13 loosely mounted on the shaft 2, while the opposite end thereof is extended through a bracket 14 extending outwardly from one wall of the chute 4, this end of the shaft having secured thereto a disk 15, to which the outer end of the pitman 8 is secured, the pivot pin for the pitman being eccentrically mounted on the disk, whereby when the disk is rotated, the agitating bars 6 will be swung laterally.

The potatoes are moved the full length of the agitating bars 6 by providing an endless belt to travel longitudinally of the agitating bars, which belt consists of a plurality of slats 16, which are secured at each end to sprocket chains 17, said chains being directed around sprocket wheels 18 and 19, the sprocket wheels 18 being carried by a shaft 20, while the sprocket wheels 19 are carried by a shaft 21.

The shaft 21 is extended a distance from one face of the chute 4 and has fixed thereto a sprocket 22, around which passes a driving chain 23, the opposite end of said chain extending around a sprocket 24 loosely mounted on the shaft 2, the inner face of said sprocket having a bevel gear 25, which is adapted to mesh with and be driven by the pinion 11, said gear 25 being on the opposite side of the pinion 11 from the bevel gear 10 and rotates in the opposite direction therefrom, thus driving the slats and chains to which they are secured, rearwardly in the chute 4.

The forward end of the chute 4 is suspended by means of arms 26, which arms coöperate with the frame 1 to retain the lower end of the chute at various heights and regulate the depth to which the plow will enter the soil.

In operation, the forward end of the chute 4 is lowered, thereby disposing the chute at an angle to the frame 1 and when the forward end of the chute has been lowered to the proper extent, it is secured in its adjusted position in any preferred manner, as by introducing cotter pins 27 through openings 28 in the arms 26 and as said arms pass through slots in the frame 1, the introduction of the cotter pins through the openings 28 will prevent the longitudinal movement of said arms and hold the end of the chute in its adjusted position. As the digger is then moved forwardly, the plow enters the soil and carries the soil loosened by the plow into the path of the slats 16 and onto the agitating bars 6, and the soil is thereby loosened from the potatoes, the slats being so arranged as to come in contact with the soil immediately in the rear of the plow 5 and to prevent the soil and potatoes from descending between the end of the plow and the ends of the agitating bars, a board 29 is pivotally mounted between the side rails of the chute 4 and is adapted to extend substantially into engagement with the ends of the agitating bars 6, the pivotal points of said board being adjacent one edge thereof, whereby when one of the slats engages the board from below, said board will swing upwardly and permit the slat to pass, but will immediately descend and remain in a horizontal position until engaged by the next succeeding slat. The forward movement of the digger also imparts motion to the shaft 12 and swings the bars 6 laterally, thereby agitating the soil passing thereover and causing the same to descend between the bars while the potatoes are retained on the bars and carried to the rear end thereof by the slats 16, where they are deposited in the receptacle 9, the vines being carried beyond the receptacle and thrown upon the ground, thereby leaving the potatoes free of foreign particles and in condition to be stored away or taken to the market.

It will thus be seen that I have provided means for thoroughly separating the earth from the potatoes while passing from the plow to the upper end of the chute and it will likewise be seen that I have provided means for carrying the potatoes and vines to the upper end of the chute and depositing the potatoes in a receptacle, while the vines are separated from the potatoes and thrown to the ground and it will also be seen that I have provided means for preventing the descent of the soil between the plow and ends of the agitating bars and at the same time permitting the slats to pass therebetween.

What I claim is:

1. The combination with a frame and an axle rotatably mounted in said frame; of a chute pivoted on said axle, a cross bar adjacent the rear end of said chute, a plurality of agitating bars pivoted to said cross bar, a pitman pivotally secured adjacent the opposite ends of said bars, means to move said pitman longitudinally, whereby said agitating bars will be swung laterally on their pivots, a plow at the forward end of said chute, a plurality of slats adapted to travel over said agitating bars, chains to which said slats are secured, means to move said slats longitudinally of the agitating bars, means between the plow and forward ends of the agitating bars to prevent the soil from descending between the plow and bars.

2. In a potato digger of the class described, the combination with a frame, an axle rotatably mounted on said frame and driving wheels at the ends of said axle; of a chute pivoted to said axle, a plow at the forward end of said chute and a receptacle at the opposite end thereof, a plurality of agitating bars, a cross bar adjacent the rear end of said chute, to which said bars are pivotally secured, a portion of said bars extending over said receptacle, a pitman secured to the opposite ends of said bars, a shaft adapted to move said pitman longitudinally and swing said bars laterally, a bevel gear fixed to said axle, a pinion on said shaft meshing with said gear, an endless belt adapted to move over said agitating bars, sprockets at each end of said belt, shafts supporting said sprockets, one of said shafts being extended from the chute, a sprocket on the extended end of said shaft, a sprocket chain extending around said sprocket, a driving sprocket loosely mounted on the axle and adapted to engage the opposite end of said sprocket chain, a bevel gear on the last mentioned sprocket adapted to be engaged and rotated by said pinion and pivoted means between said plow and the ends of the agitating bars to prevent the soil from descending between the plow and bars.

3. A potato digger of the class described, comprising the combination with an axle and driving wheels therefor; of a chute pivotally mounted on said axle, a cross bar adjacent one end of said chute, a plurality of agitating bars pivoted to said cross bar, a portion of said agitating bars being longer than the remainder of the bars, means to swing said agitating bars on their pivot points, an endless belt formed of slats and sprocket chains adapted to travel over said agitating bars, a plow at the forward end of said chute and a board pivotally mounted between said plow and the ends of the agitating bars, whereby said board will swing upwardly and permit the slats to pass from below to the upper surface of said bars and rest in a horizontal position when not engaged by said slats and prevent the descent of the soil between the plow and the ends of the agitating bars.

In testimony whereof I have signed my name to this specification in the presence of two subscribing witnesses.

MARTIN HEBTING.

Witnesses:
J. O. FRANCY,
F. E. EASTMAN.